(12) United States Patent
Pan et al.

(10) Patent No.: US 9,218,845 B2
(45) Date of Patent: Dec. 22, 2015

(54) SYSTEMS AND METHODS FOR MULTI-HEAD BALANCING IN A STORAGE DEVICE

(71) Applicant: LSI Corporation, San Jose, CA (US)

(72) Inventors: Lu Pan, San Jose, CA (US); Haitao Xia, San Jose, CA (US); Haotian Zhang, Longmont, CO (US); Rui Cao, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 45 days.

(21) Appl. No.: 14/148,306

(22) Filed: Jan. 6, 2014

(65) Prior Publication Data

US 2015/0187385 A1 Jul. 2, 2015

Related U.S. Application Data

(60) Provisional application No. 61/922,905, filed on Jan. 2, 2014.

(51) Int. Cl.
*G11B 5/09* (2006.01)
*G11B 20/10* (2006.01)
*G11B 20/12* (2006.01)

(52) U.S. Cl.
CPC .... *G11B 20/10009* (2013.01); *G11B 20/10046* (2013.01); *G11B 20/10305* (2013.01); *G11B 20/10361* (2013.01); *G11B 20/10388* (2013.01); *G11B 20/1217* (2013.01)

(58) Field of Classification Search
None
See application file for complete search history.

(56) References Cited

U.S. PATENT DOCUMENTS

| 5,181,161 | A  * | 1/1993  | Hirose et al. | 369/47.26 |
| 5,552,942 | A  * | 9/1996  | Ziperovich et al. | 360/51 |
| 6,256,158 | B1 * | 7/2001  | Brown et al. | 360/31 |
| 6,288,861 | B1 * | 9/2001  | Blaum et al. | 360/49 |
| 6,476,992 | B1 * | 11/2002 | Shimatani | 360/46 |
| 8,693,118 | B1 * | 4/2014  | Madden et al. | 360/27 |
| 8,861,122 | B1 * | 10/2014 | Hwang et al. | 360/55 |
| 8,964,319 | B1 * | 2/2015  | Biskeborn et al. | 360/27 |
| 8,982,491 | B1 * | 3/2015  | Coker et al. | 360/51 |
| 2005/0068663 | A1 * | 3/2005 | Blaum et al. | 360/78.04 |
| 2005/0248870 | A1 * | 11/2005 | Monk et al. | 360/64 |
| 2006/0176606 | A1 * | 8/2006 | Soeno et al. | 360/77.08 |
| 2009/0207710 | A1 * | 8/2009 | Ayres et al. | 369/53.35 |
| 2009/0268595 | A1 * | 10/2009 | Fukuzawa et al. | 369/275.3 |
| 2010/0091400 | A1 * | 4/2010 | Hamaguchi | 360/75 |
| 2010/0195237 | A1 * | 8/2010 | Suwa et al. | 360/48 |
| 2011/0032635 | A1 * | 2/2011 | Fukushima | 360/75 |
| 2012/0206829 | A1 * | 8/2012 | Hatada | 360/31 |
| 2013/0182350 | A1 * | 7/2013 | Kawabe et al. | 360/51 |

OTHER PUBLICATIONS

U.S. Appl. No. 14/025,409, filed Sep. 12, 2013 Shaohua Yang, Unpublished.

* cited by examiner

*Primary Examiner* — Peter Vincent Agustin

(57) ABSTRACT

Systems and method relating generally to data processing, and more particularly to systems and methods for utilizing multiple data streams for data recovery from a storage device. As an example, a data processing system is discussed that includes a first read head and a second read head each operable to sense information on a storage medium. A synthesizer circuit is operable to determine a quality metric based upon a signal to noise ratio of a first preamble pattern compared with a signal to noise ratio of a second preamble pattern. A balancing circuit is operable to generate a composite output as a combination of a first data set derived from the first read head a second data set derived from the second read head based at least in part on the quality metric.

20 Claims, 7 Drawing Sheets

SYSTEMS AND METHODS FOR MULTI-HEAD BALANCING IN A STORAGE DEVICE

CROSS REFERENCE TO RELATED APPLICATIONS

The present application claims priority to (is a non-provisional of) U.S. Pat. App. No. 61/922,905 entitled "Systems and Methods for Multi-Head Balancing in Storage System", and filed Jan. 2, 2014 by Pan et al. The entirety of the aforementioned provisional patent application is incorporated herein by reference for all purposes.

FIELD OF THE INVENTION

Systems and method relating generally to data processing, and more particularly to systems and methods for utilizing multiple data streams for data recovery from a storage device.

BACKGROUND

Traversing a storage medium using multiple read heads makes is easier to correctly access data from the storage medium. However, in some cases, misalignment of the read heads can introduce considerable interference from adjacent areas of the storage medium which in some cases may make the correctly accessing the data more difficult.

Hence, for at least the aforementioned reasons, there exists a need in the art for advanced systems and methods for processing data from a storage medium.

SUMMARY

Systems and method relating generally to data processing, and more particularly to systems and methods for utilizing multiple data streams for data recovery from a storage device.

Various embodiments of the present invention provide data processing systems that include: a first read head, a second read head, a synthesizer circuit, and a balancing circuit. The first read head is operable to sense information on a storage medium and to provide a first output, and the second read head is operable to sense information on a storage medium and to provide a second output. The synthesizer circuit is operable to determine a quality metric based upon a signal to noise ratio of a first preamble pattern compared with a signal to noise ratio of a second preamble pattern, and the balancing circuit operable to generate a composite output as a combination of the first data set derived from the first output and a second data set derived from the second output based at least in part on the quality metric.

This summary provides only a general outline of some embodiments of the invention. The phrases "in one embodiment," "according to one embodiment," "in various embodiments", in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Systems and method relating generally to data processing, and more particularly to systems and methods for utilizing multiple data streams for data recovery from a storage device.

Figure 1:
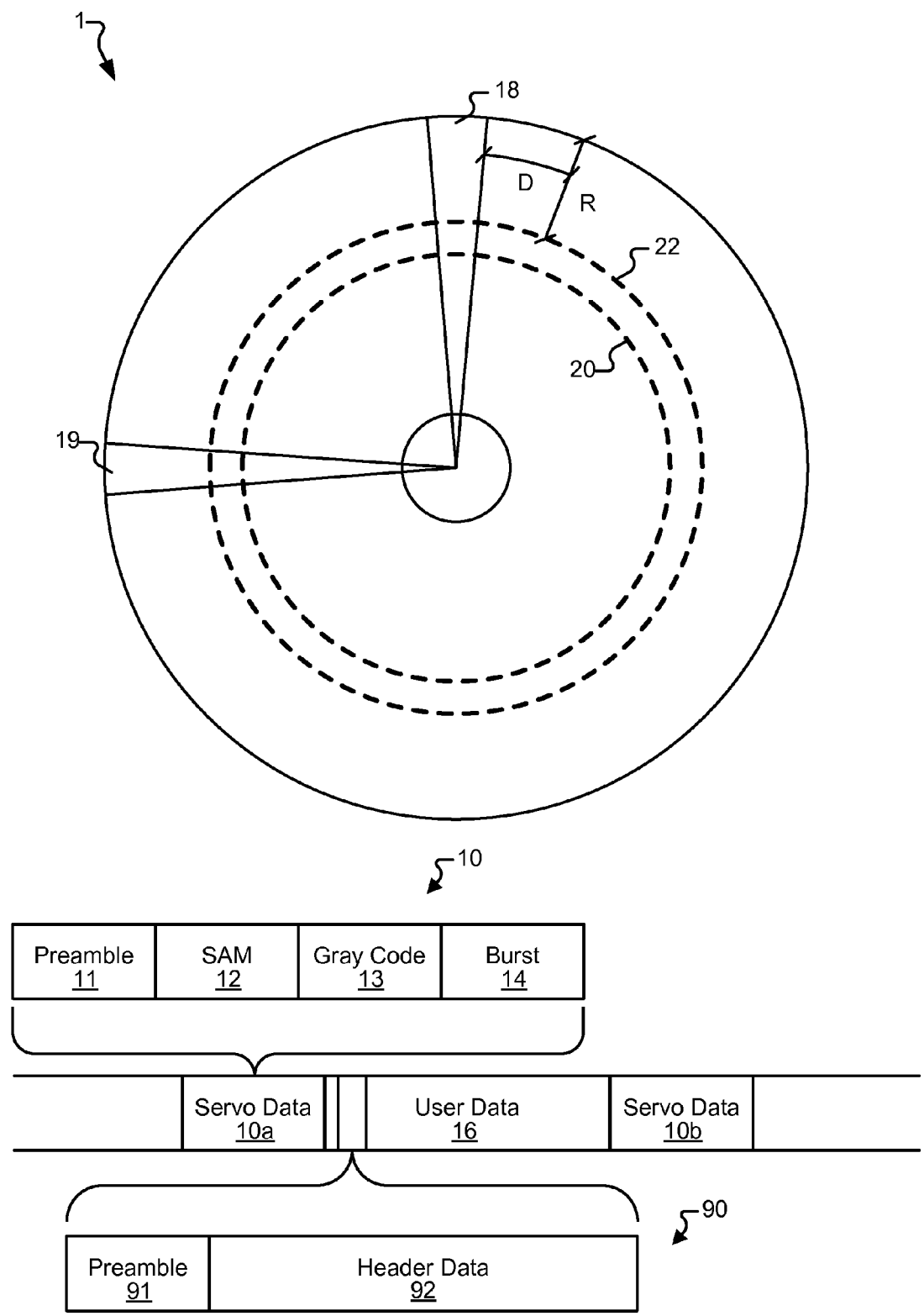
FIG. 1 is a block diagram of a known magnetic storage medium and sector data scheme.

Turning to FIG. 1, a storage medium 1 is shown with two exemplary tracks 20, 22 indicated as dashed lines. The tracks are divided into sectors by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 may include wedge identification information followed by the SAM. Sector address mark 12 is followed by a Gray code 13, and Gray code 13 is followed by burst information 14. Gray code 13 may include track identification information. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 includes some synchronization and header data 90 that includes a preamble pattern 91 and a head data 92 followed by user data within user data region 16. Based upon the disclosure provided herein, one of ordinary skill in the art will recognize a variety of data that may be included in header data 92.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. When reading data in user data region 16, synchronization to the data is done through use of preamble 91. In a write operation, the sensor would sense servo data from wedge 19 then write data to the user data region between wedge 19 and wedge 18. Then, the sensor would be switched to sense a remaining portion of the user data region followed by the servo data from wedge 18. Of note, wedges 18, 19 follow arcs corresponding to the geometry of an arm and pivot as is known in the art.

Various embodiments of the present invention provide data processing systems that include: a first read head, a second read head, a synthesizer circuit, and a balancing circuit. The first read head is operable to sense information on a storage medium and to provide a first output, and the second read head is operable to sense information on a storage medium and to provide a second output. The synthesizer circuit is operable to determine a quality metric based upon a signal to noise ratio of a first preamble pattern compared with a signal to noise ratio of a second preamble pattern, and the balancing circuit operable to generate a composite output as a combination of the first data set derived from the first output and a second data set derived from the second output based at least in part on the quality metric. In some cases, the first preamble pattern is a 2T pattern and the second preamble pattern is a 3T pattern. In various cases, the first preamble pattern is orthogonal to the second preamble pattern.

In some instances of the aforementioned embodiments, the first read head and the second read head are disposed over the same target track on a storage medium, and the target track on the storage medium exhibits the first preamble pattern. In some cases, a first adjacent track adjacent to one side of the target track exhibits the second preamble pattern, and a second adjacent track adjacent to another side of the target track exhibits the second preamble pattern.

In various instances of the aforementioned embodiments, the systems further include: a first energy calculation circuit operable to calculate an energy of the first data set; and a second energy calculation circuit operable to calculate an energy of the second data set. In some such instances, signal to noise ratio of a first preamble pattern is calculated based upon the energy of the first data set and the signal to noise ratio of a second preamble pattern is calculated based upon the energy of the second data set. In some cases, the energy of the first data set includes a first preamble energy corresponding to energy from the first preamble pattern, and a second preamble energy corresponding to energy from the second preamble pattern; and the energy of the second data set includes a third preamble energy corresponding to energy from the first preamble pattern, and a fourth preamble energy corresponding to energy from the second preamble pattern.

In one or more instances of the aforementioned embodiments, the synthesizer circuit is further operable to determine a head offset percentage of the first read head based upon a ratio of a signal to noise ratio of for the first preamble pattern to the signal to noise ratio for the second preamble pattern for data derived from the first output. In particular instances of the aforementioned embodiments, the synthesizer circuit is further operable to determine a head offset percentage of the second read head based upon a ratio of a signal to noise ratio of for the first preamble pattern to the signal to noise ratio for the second preamble pattern for data derived from the second output.

In various instances of the aforementioned embodiments, the data processing system further includes: first analog to digital converter circuit operable to convert the first output into a first series of digital samples synchronous to a clock, a second analog to digital converter circuit operable to convert the second output into a second series of digital samples synchronous to the clock, and a loop feedback circuit. The loop feedback circuit is operable to generate a clock adjustment for use in modifying the clock. The clock adjustment is generated based at least in part on a combination of the first data set and the second data set, where the combination of the first data set and the second data set is generated based at least in part on the quality metric.

Other embodiments of the present invention provide storage devices that include: a storage medium, a first read head, and a second read head. The storage medium includes a target track, a first adjacent track on one side of the target track, and a second adjacent track on another side of the target track. The target track exhibits a first preamble pattern, and both the first adjacent track and the second adjacent track exhibit a second preamble pattern. The first read head is operable to sense information on a storage medium and to provide a first output, and the second read head is operable to sense information on a storage medium and to provide a second output, Both the first read head and the second read head are disposed over the target track, and the first output and the second output correspond to information sensed from the target track. In some instances, the first preamble pattern is orthogonal to the second preamble pattern. In particular instances, the first preamble pattern is a 2T pattern and the second preamble pattern is a 3T pattern.

Various embodiments of the present invention rely on interference from an alternate preamble written to an adjacent track of data on a storage medium to determine which head of a multi-head reader is most accurate, and to balance outputs from the multiple heads based upon a quality of one head compared with another. In addition, some embodiments of the present invention use the quality of one head compared with another to govern loop feedback and/or coefficient selection.

Figure 2A:
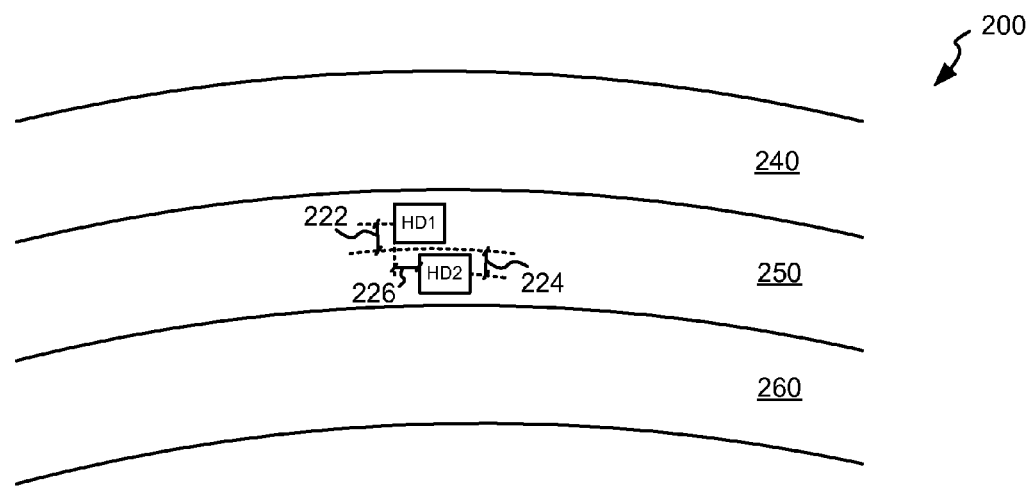
FIGS. 2a-2b are diagrams showing of multiple tracks of a storage medium traversed by two read heads, and each of the tracks including alternating preambles as part of a servo data region in accordance with various embodiments of the present invention.
Figure 2B:
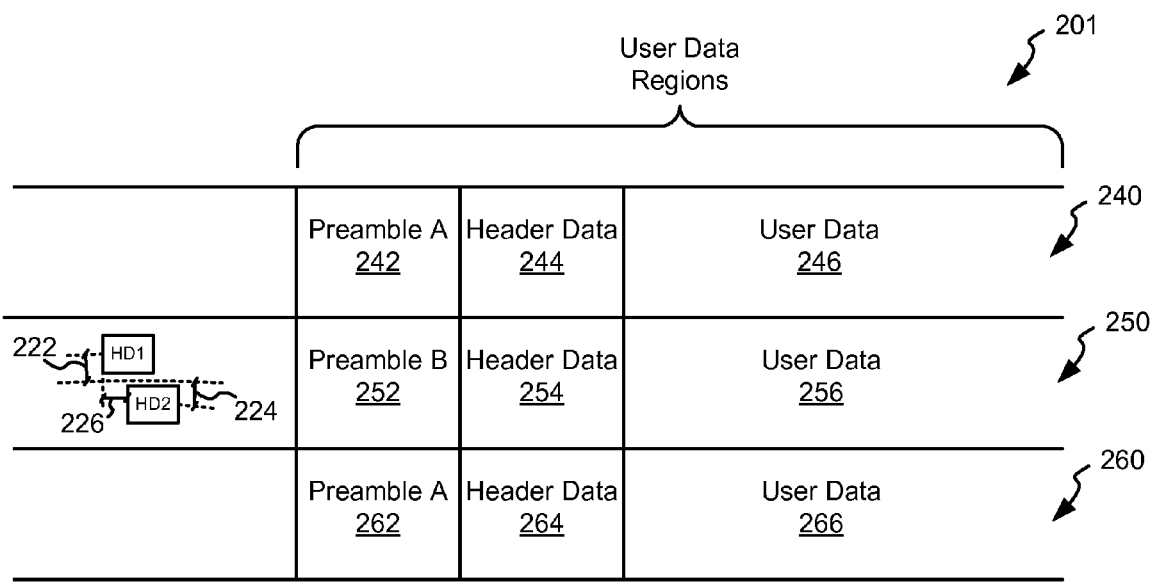

Determining the quality of the data provided from one head or another relies upon alternating preambles between adjacent tracks of a storage medium. Turning to FIG. 2a, a diagram 200 shows three tracks 240, 250, 260 on a storage medium. Also shown are two read heads HD1, HD2 traversing track 250, and thereby sensing information previously stored on track 250. Read head HD1 is displaced from the center of track 250 by a lateral distance 222, and read head HD2 is displaced from the center of track 250 by a lateral distance 224. In addition, read head HD2 lags read head HD1 by an inline distance 226. In some cases, the distances of one read head relative to the other read head are substantially fixed as both heads are fixed to the same read/write head assembly. Where lateral distance 222 increases and lateral distance 224 decreases, read head HD1 will start to experience greater interference from the data stored on track 240. Conversely, where lateral distance 224 increases and lateral distance 222 decreases, read head HD2 will start to experience greater interference from the data stored on track 260. This interference from adjacent tracks decreases the quality of the signal provided from the read head experiencing the interference (i.e., the signal of track 250 relative to the signal from an adjacent track decreases). Turning to FIG. 2b, a user data region 201 of the three tracks 240, 250, 260 is shown. Similar to conventional art, each of the user data regions includes a preamble and header data. The preambles alternate between tracks. In particular, track 240 includes a preamble A 242, track 250 includes a preamble B 252, and track 260 repeats the preamble A 262. Preamble A 242 is followed by header data 244 and user data 246; preamble B 252 is followed by header data 254 and user data 256; and preamble A 262 is followed by header data 264 and user data 266.

Preamble A is specifically designed to operate both for synchronization purposes, and also to be unmistakable from preamble B that also serves synchronization purposes. In one particular embodiment of the present invention, preamble A is a 2T preamble (i.e., a pattern that repeats every two periods such as, for example, '00110011'), and preamble B is a non-2T pattern. Such non-2T patterns may include, but are not limited to, a 3T preamble (i.e., a pattern that repeats every three periods such as, for example, '000111000111') or a 2.5T preamble (i.e., a pattern that repeats every two and one half periods such as, for example, '0011100111'). Based upon the disclosure provided herein, one of ordinary skill in the art will recognize various combinations of patterns that may be used for preamble A and preamble B in accordance with different embodiments of the present invention.

As discussed above, where lateral distance 224 increases and lateral distance 222 decreases, read head HD2 will start to sense more and more of preamble A of track 260, and the ratio of the signal derived from preamble B of track 250 and the signal derived from preamble A of track 260 will decrease (i.e., there will be a decrease in the signal to noise ratio). Similarly, where lateral distance 222 increases and lateral distance 224 decreases, read head HD1 will start to sense more and more of preamble A of track 240, and the ratio of the signal derived from preamble B of track 250 and the signal derived from preamble A of track 240 will decrease. As the pattern of preamble A is guaranteed to be distinct from the pattern of preamble B, the interference from one track to the other is readily detectable and can be reduced to a quality indication as more fully discussed below.

Figure 3:
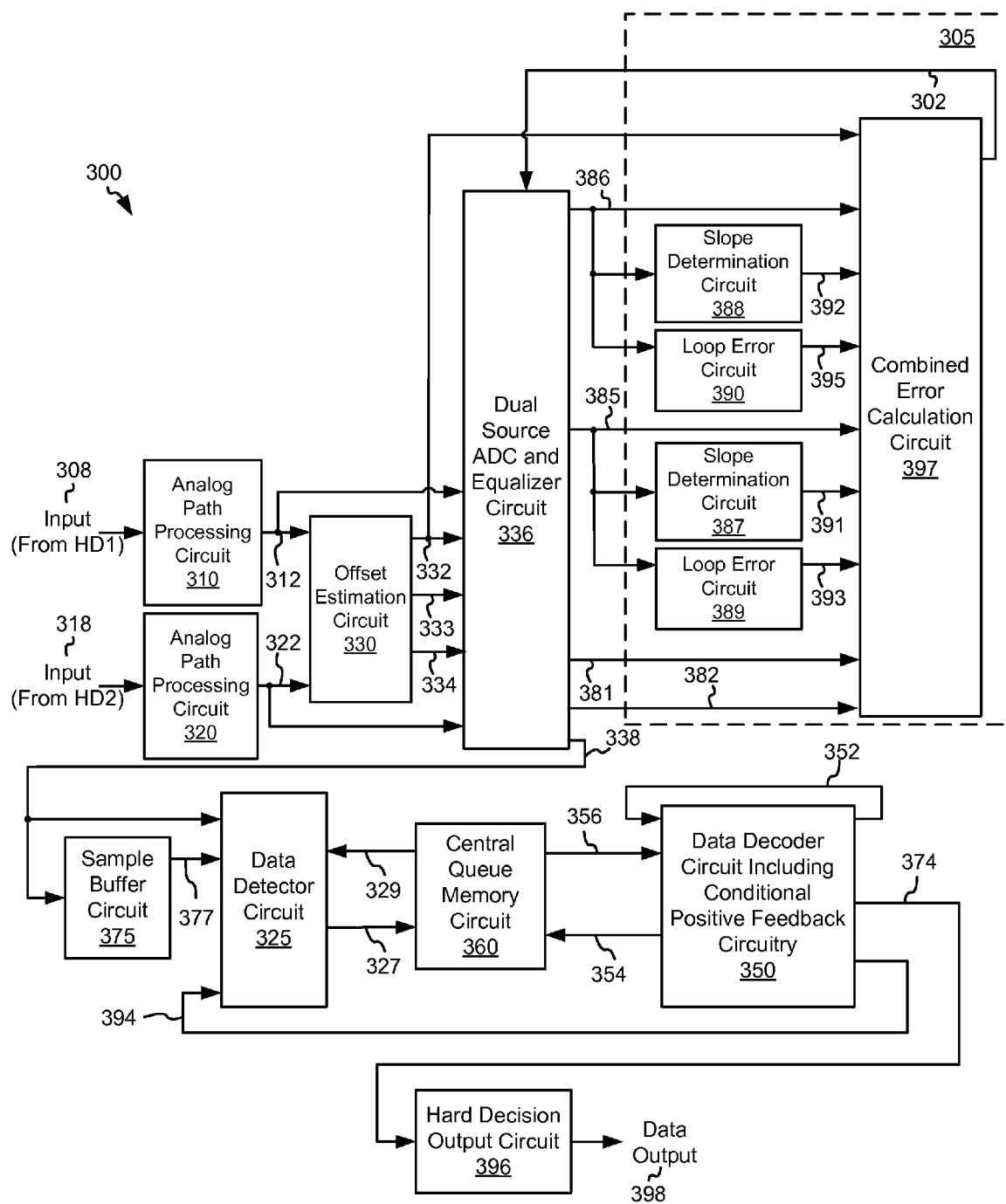
FIG. 3 is a processing circuit able to accept inputs from two distinct read heads and to balance the received inputs to yield a unified processing output in accordance with some embodiments of the present invention.

Turning to FIG. 3, a processing circuit 300 is shown that is able to accept inputs from two distinct read heads (not shown) and to balance the respective inputs 308, 318 to yield a unified processing output 338 in accordance with some embodiments of the present invention. Inputs 308, 318 may be derived from respective read heads disposed in relation to a storage medium. Based upon the disclosure provided herein, one of ordinary skill in the art will recognize a variety of sources from which inputs 308, 318 may be derived.

Processing circuit 300 includes an analog path processing circuit 310 that processes input 308 to yield a processed signal 312. Processed signal 312 is provided to an offset calculation circuit 330. Analog path processing circuit 310 may include, but is not limited to, a preamplifier circuit and an analog front end circuit including, for example, an analog filter circuit. Based upon the disclosure provided herein, one of ordinary skill in the art will recognize a variety of circuitry that may be included as part of analog path processing circuit 310. In addition, processing circuit 300 includes an analog path processing circuit 320 that processes input 318 to yield a processed signal 322. Processed signal 322 is also provided to offset calculation circuit 330. Analog path processing circuit 320 may be designed similar to that of analog processing circuit 310.

Offset estimation circuit 330 uses both processed signal 312 and processed signal 322 to determine whether one of the sources from which inputs 308, 318 are derived is receiving a noisier signal than the other. Where input 308 is a noisier signal that input 318, offset estimation circuit 330 will generate a head offset signal 333 indicating a lateral skew (i.e., a change in lateral distances 222, 224) causing the noise difference and a quality signal 332 favoring input 318 over input 308. In contrast, where input 318 is a noisier signal that input 308, offset estimation circuit 330 will generate head offset signal 333 indicating the lateral skew causing the noise difference and quality signal 332 favoring input 308 over input 318. In addition, offset estimation circuit 330 generates an inline offset signal 334 (i.e., a signal corresponding to inline distance 226).

Figure 4A:
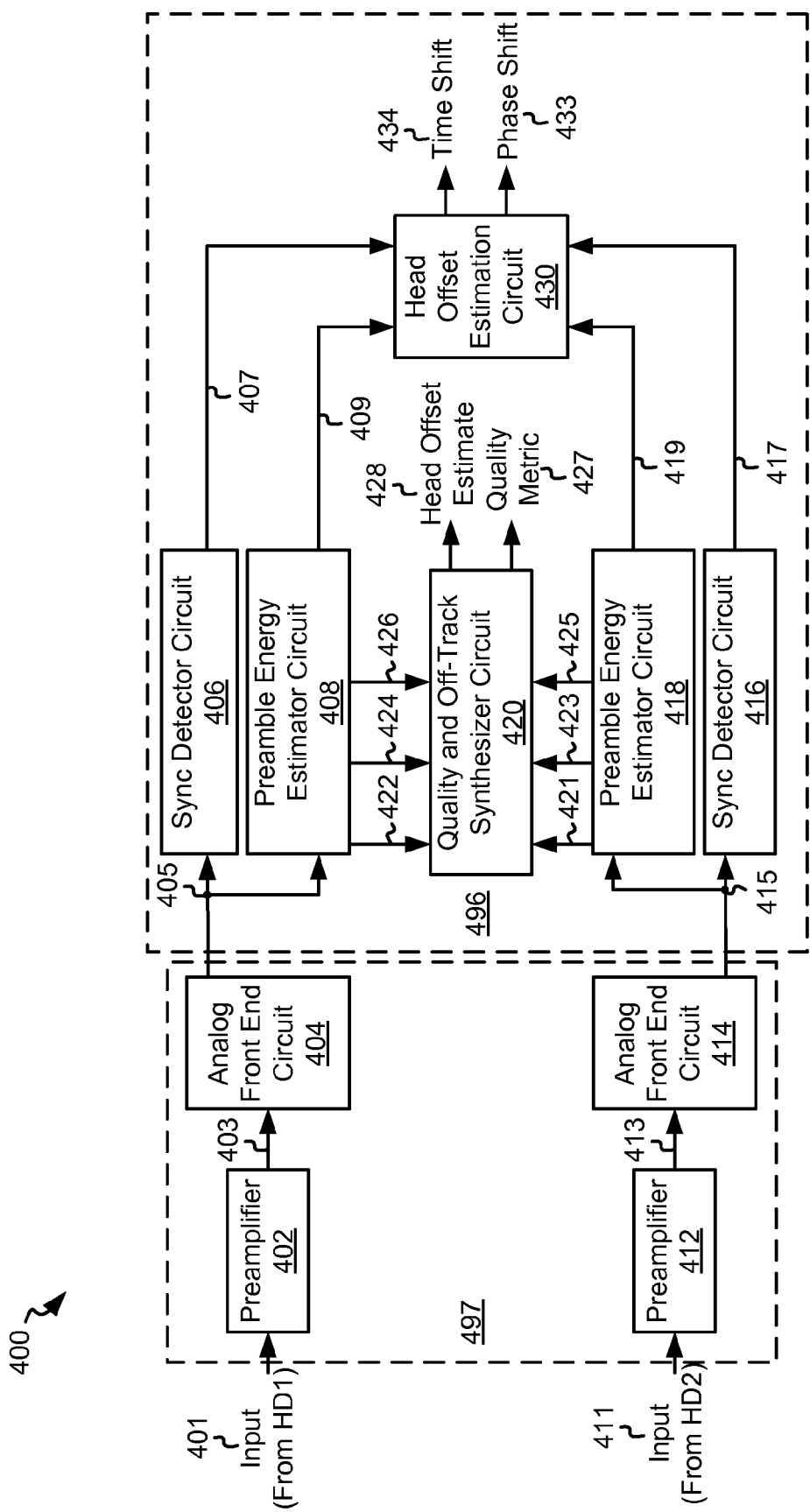
FIGS. 4a-4c show component parts of the processing circuit of FIG. 3 in accordance with various embodiments of the present invention.

An example implementation of the combination of analog processing path circuit 310, analog processing path circuit 320 and offset estimation circuit 330 is shown in accordance with some embodiments of the present invention is shown in FIG. 4a. Turning to FIG. 4a, an implementation 400 includes a dual path analog processing circuit 497 and an offset estimation circuit 496. When implementation 400 is used in relation to processing circuit 300, an input 401 is connected to input 308, an input 411 is connected to input 318, a head offset output 428 is connected to head offset signal 333, a quality metric is connected to quality signal 332, and one of a time shift 434 or a phase shift 433 is connected to inline offset signal 334.

Dual path analog processing circuit 497 includes a preamplifier 402 that amplifies input 401 to yield an amplified signal 403. Amplified signal 403 is provided to an analog front end circuit 404 that processes amplified signal 403 to yield a processed signal 405. Processed signal 405 corresponds to processed signal 312 of FIG. 3. Analog front end circuit 404 may include, but is not limited to, an analog filtering circuit (not shown). In addition, dual path analog processing circuit 497 includes a preamplifier 412 that amplifies input 411 to yield an amplified signal 413. Amplified signal 413 is provided to an analog front end circuit 414 that processes amplified signal 413 to yield a processed signal 415. Processed signal 415 corresponds to processed signal 322 of FIG. 3. Analog front end circuit 414 may include, but is not limited to, an analog filtering circuit (not shown).

Offset estimation circuit 496 includes a sync detector circuit 406 that applies a sync detection algorithm to processed signal 405, where the sync detection algorithm is dynamically selected for the particular region of a storage medium from which inputs 401, 411 are being received. For example, where inputs 401, 411 are being read from a track of a storage medium using a preamble A (see FIG. 2b above), then sync detector circuit 406 is dynamically tuned to look for preamble A. On the other hand, where inputs 401, 411 are being read from a track of a storage medium using a preamble B (see FIG. 2b above), then sync detector circuit 406 is dynamically tuned to look for preamble B. Using a specific example where preamble A is a 2T preamble and preamble B is a 3T preamble, where inputs 401, 411 are being read from a track of a storage medium using a 2T pattern, then sync detector circuit 406 is dynamically tuned to look for 2T pattern. In contrast, where inputs 401, 411 are being read from a track of a storage medium using a 3T pattern, then sync detector circuit 406 is dynamically tuned to look for 3T pattern. In addition, offset estimation circuit 496 includes a sync detector circuit 416 that looks for a defined preamble pattern in processed signal 415. Sync detector circuit 416 is the same as sync detector circuit 406, and is dynamically tuned to detect the same preamble as sync detector circuit 406. When sync detector circuit 406 identifies the preamble pattern corresponding to the particular region from which input 401 is being derived in processed signal 405, it provides a time stamp 407 indicating a time at which the pattern was detected. Similarly, when sync detector circuit 416 identifies the same pattern queried by sync detector circuit 406 in processed signal 415, it provides a time stamp 417 indicating a time at which the pattern was detected.

Offset estimation circuit 496 also includes a preamble energy estimator circuit 408 that is operable to estimate the overall energy in processed signal 405, and to estimate the portion of the overall energy corresponding to the preamble A and the portion of the overall energy corresponding to the preamble B. Where, for example, preamble A is a 2T pattern and preamble B is a 3T pattern, the resolution for the energy computations will be 12T, where T indicates a period. The energy computations may be done using any energy computation approach known in the art. The computed overall energy is provided as an overall energy output 422 to a quality and off-track synthesizer circuit 420, the energy from preamble A is provided as an preamble A energy output 424 to quality and off-track synthesizer circuit 420, and the energy from preamble B is provided as an preamble B energy output 426 to quality and off-track synthesizer circuit 420. In addition, preamble energy estimator circuit 408 provides a phase output 409 that indicates a phase where overall energy 422 is a maximum.

Similar to preamble energy estimator circuit 408, a preamble energy estimator circuit 418 is operable to estimate the overall energy in processed signal 415, and to estimate the portion of the overall energy corresponding to the preamble A and the portion of the overall energy corresponding to the preamble B. The computed overall energy is provided as an overall energy output 421 to a quality and off-track synthesizer circuit 420, the energy from preamble A is provided as an preamble A energy output 423 to quality and off-track synthesizer circuit 420, and the energy from preamble B is provided as an preamble B energy output 425 to quality and off-track synthesizer circuit 420. In addition, preamble energy estimator circuit 418 provides a phase output 419 that indicates a phase where overall energy 421 is a maximum.

Quality and off-track synthesizer circuit 420 calculates a signal to noise ratio for each of processed signal 405 and processed signal 415. In particular, where the expected preamble is preamble A, quality and off-track synthesizer circuit 420 calculates the signal to noise ratios in accordance with the following equations:

$$\text{Preamble } A \text{ } SNR \text{ of Input } 401 = \frac{\text{Preamble Energy } A \text{ } 424}{\text{Overall Energy } 422}; \text{ and}$$

$$\text{Preamble } A \text{ } SNR \text{ of Input } 411 = \frac{\text{Preamble Energy } A \text{ } 423}{\text{Overall Energy } 421}.$$

In contrast, where the expected preamble is preamble B, quality and off-track synthesizer circuit 420 calculates the signal to noise ratios in accordance with the following equations:

$$\text{Preamble } B \text{ } SNR \text{ of Input } 401 = \frac{\text{Preamble Energy } B \text{ } 426}{\text{Overall Energy } 422}; \text{ and}$$

$$\text{Preamble } B \text{ } SNR \text{ of Input } 411 = \frac{\text{Preamble Energy } B \text{ } 425}{\text{Overall Energy } 421}.$$

It should be noted that in some cases, it is not necessary to know beforehand whether the region being accessed has a preamble A or a preamble B as quality and off-track synthesizer circuit 420 may simply calculate the signal to noise ratio for both preambles, and the preamble that yields the highest signal to noise ratio is selected as the actual preamble for the region. The ratio of the signal to noise ratio for the actual preamble to the signal to signal noise ratio for the adjacent preamble corresponds to how much percentage the head from which the signal is derived is off track. Thus, where for example the actual preamble is preamble A and the adjacent preamble is preamble B, a head offset for the two paths may be calculated in accordance with the following equations:

$$\text{Offset of Input } 401 = \frac{\text{Preamble } A \text{ } SNR \text{ of Input } 401}{\text{Preamble } B \text{ } SNR \text{ of Input } 401}; \text{ and}$$

$$\text{Offset of Input } 411 = \frac{\text{Preamble } A \text{ } SNR \text{ of Input } 411}{\text{Preamble } B \text{ } SNR \text{ of Input } 411}.$$

Because the two heads (i.e., the head from which input 401 is derived and the head from which input 411 is derived) move laterally together, the aforementioned offset values move together. In particular, as the head from which input 401 is derived moves toward the adjacent preamble (in this example preamble B), the value of the offset for input 401 will decrease. As this happens, the head from which input 411 is derived moves more toward the center of the region of preamble A and exhibits less interference from preamble B. As such, the value of the offset for input 411 will increase. The reverse is true where the head from which input 411 is derived moves toward the adjacent preamble (in this example preamble B), the value of the offset for input 411 will decrease. As this happens, the head from which input 401 is derived moves more toward the center of the region of preamble A and exhibits less interference from preamble B. As such, the value of the offset for input 401 will increase. Head offset estimate 428 is a composite of the offset for input 401 and the offset for input 411. In addition to other uses discussed herein, this head offset information may be used to adjust the head locations.

Quality and off-track synthesizer circuit 420 determines quality metric 427 based upon a comparison of the signal to noise ratio for one preamble for input 401 and the signal to noise ratio for the other preamble for input 411. As an example, where the actual preamble is a 2T preamble and the adjacent preamble is a 3T preamble, quality metric 427 is determined by comparing the signal to noise ratio of input 401 for the 2T preamble with the signal to noise ratio of input 411 for the 3T path. The larger of the aforementioned signal to noise ratios indicates a better signal quality, and the data from the input with the higher signal to noise ratio is indicated by quality metric 427 and used as the main signal path for loop adaptation.

Phase output 409, phase output 419, time stamp 407, and time stamp 417 are provided to a head offset estimation circuit 430. Head offset estimation circuit 430 provides indicators corresponding to the inline separation between the head from which input 401 is derived and the head from which input 411 is derived (e.g., inline distance 226). In particular, head offset estimation circuit 430 calculates time shift 434 and phase shift 433 in accordance with the following equations:

Time Shift 434=Time Stamp 407−Time Stamp 417; and

Phase Shift 434=Phase Stamp 409−Phase Stamp 419.

Figure 4B:
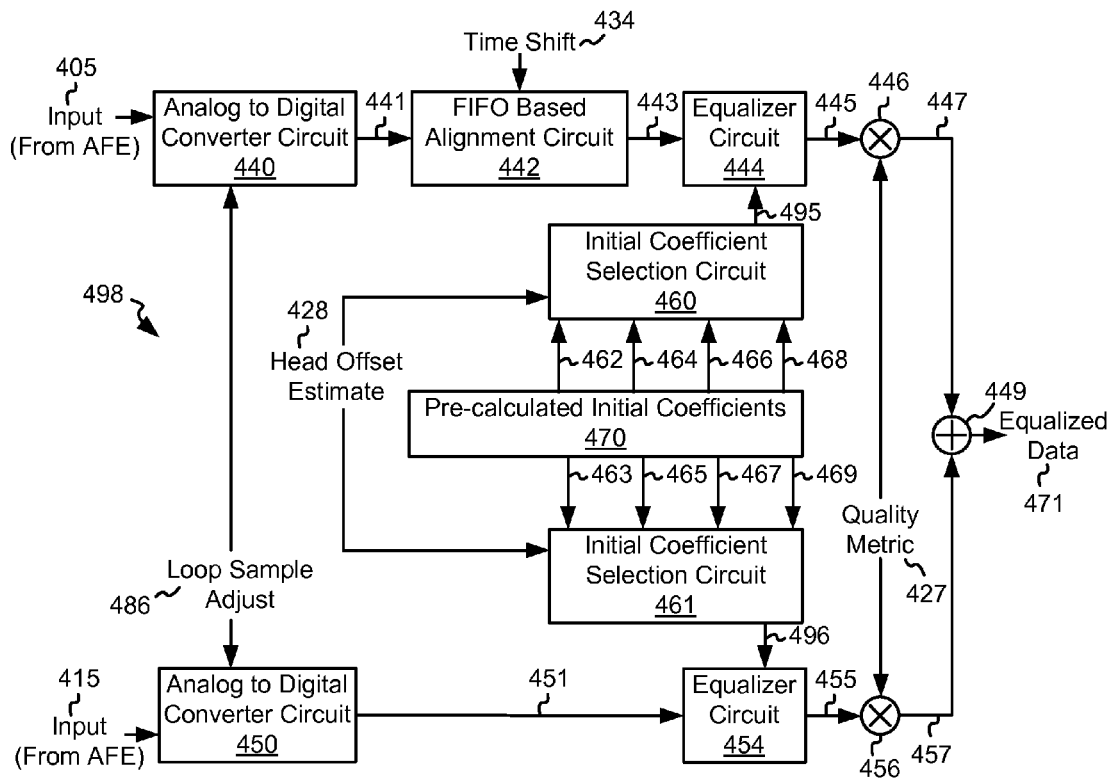

Returning to FIG. 3, quality signal 332, head offset signal 333, and inline offset signal 334 are provided to a dual source ADC and equalizer circuit 336 where they are used in applying analog to digital conversion and equalization to processing signal 312 and processing signal 322 to yield unified processing output 338. An example implementation of a dual source ADC and equalizer circuit 336 is shown in accordance with some embodiments of the present invention is shown in FIG. 4b. Turning to FIG. 4b, an implementation 498 is shown. Where implementation 498 is used in place of dual source ADC and equalizer circuit 336, an input 405 is connected to processed signal 312, an input 415 is connected to processed signal 322, and an equalized data 471 is connected to unified processing output 338. Implementation 498 includes an analog to digital converter circuit 440 that converts input 405 into a series of digital samples 441 synchronous to a sampling clock corrected by a loop sample adjustment 486, and an analog to digital converter circuit 450 that converts input 415 into a series of digital samples 451 synchronous to the sampling clock. Analog to digital converter circuits 440, 450 may be any circuits known in the art that is capable of producing digital samples corresponding to an analog input signal. Based upon the disclosure provided herein, one of ordinary skill in the art will recognize a variety of analog to digital converter circuits that may be used in relation to different embodiments of the present invention.

A FIFO based alignment circuit 442 aligns digital samples 441 with digital samples 451 using time shift 434 to yield aligned samples 443. This alignment compensates for the fact that the head from which input 405 is derived leads the head from which input 415 is derived by a fixed distance (e.g., inline distance 226) represented by time shift 434. In other cases, phase shift 433 may be used to govern the alignment process. FIFO based alignment circuit 442 may be any circuit known in the art that is capable of time shifting samples based upon an offset input.

Aligned samples 443 are provided to an equalizer circuit 444 that applies an equalization algorithm governed by coefficients 495 to yield an equalized output 445. Similarly, digital samples 451 are provided to an equalizer circuit 454 that applies an equalization algorithm governed by coefficients 496 to yield an equalized output 455. In some embodiments of the present invention, equalizer circuits 444, 454 are digital finite impulse response filter circuits as are known in the art. Equalized output 445 is provided to a multiplier circuit 446 where it is multiplied by quality metric 427 to yield a product 447, and equalized output 455 is provided to a multiplier circuit 456 where it is multiplied by quality metric 427 to yield a product 457. As one example, where the head from which input 405 is derived is substantially off-track as determined by quality and off-track synthesizer circuit 420, the value of quality metric 427 provided to multiplier circuit 446 is zero and the value of quality metric 427 provided to multiplier circuit 456 is one. Alternatively, where the head from which input 415 is derived is substantially off-track as determined by quality and off-track synthesizer circuit 420, the value of quality metric 427 provided to multiplier circuit 446 is one and the value of quality metric 427 provided to multiplier circuit 456 is zero. Where one head or the other is only slightly off-track determined by quality and off-track synthesizer circuit 420 a weighted balance is applied with, for example, the value being provided to the multiplier circuit corresponding to the head that is slightly off-track receiving a value of 0.3 for quality metric 427, and the other multiplier circuit receiving the residual value of 0.7. Where the signal to noise ratios of both of the heads are similar, of value of 0.5 for the quality metric is provided to each of multiplier circuit 446 and multiplier circuit 456. Products 447, 457 are each provided to a summation circuit 449 where they are added to yield equalized data 471. This addition yields a weighted average between equalized output 445 and equalized output 455 with the weighting in the average derived from the values of quality metric 427.

Where one head or the other is off-track, coefficients 495, 496 used by equalizer circuit 444 and equalizer circuit 454 may need additional adjustment to compensate. To provide such compensation, pre-calculated initial coefficients may be used. In one particular case, a zero percent off-track coefficient set 462, 463; a five percent off-track coefficient set 464, 465; a ten percent off-track coefficient set 466, 467; and a fifteen percent off-track coefficient set 468, 469 may be available and provided to respective initial coefficient selection circuits 460, 461 from a coefficient memory 470. Based upon head offset estimate 428, the coefficient set corresponding to the head offset may be selected and provided as coefficients 495 and coefficients 496. For example, where head offset estimate 428 indicates that neither head is experiencing significant interference from an adjacent preamble pattern, coefficients 495 are selected to be zero percent off-track coefficient set 462 and coefficients 496 are selected to be zero percent off-track coefficient set 463. As another example, where head offset estimate 428 indicates that the head from which input 405 is derived is ten percent off track and the head from which input 415 is derived is on track, coefficients 495 are selected to be ten percent off-track coefficient set 466 and coefficients 496 are selected to be zero percent off-track coefficient set 463. As yet another example, where head offset estimate 428 indicates that the head from which input 415 is derived is five percent off track and the head from which input 405 is derived is on track, coefficients 495 are selected to be zero percent off-track coefficient set 462 and coefficients 496 are selected to be five percent off-track coefficient set 465. It should be noted that initial coefficient selection circuits 460, 461 may be augmented to allow for interpolation between coefficient sets to allow for finer resolution. For example, where head offset estimate 428 indicates that the head from which input 405 is derived is eight percent off-track, an interpolation between five percent off-track coefficient set 464 and ten percent off-track coefficient set 466 may be performed to yield coefficients 495. Allowing for pre-calculated coefficients tailored for different off-track conditions provides for faster equalization convergence.

Referring again to FIG. 3, unified processing output 338 is stored to a sample buffer circuit 375 that includes sufficient memory to maintain one or more codewords until processing of that codeword is completed through a data detector circuit 325 and a data decoder circuit 350 including, where warranted, multiple "global iterations" defined as passes through both data detector circuit 325 and data decoder circuit 350 and/or "local iterations" defined as passes through data decoding circuit 350 during a given global iteration. Sample buffer circuit 375 stores the received data as buffered data 377.

Data detector circuit 325 may be any data detector circuit known in the art that is capable of producing a detected output 327. As some examples, data detector circuit 325 may be, but is not limited to, a Viterbi algorithm detector circuit or a maximum a posteriori detector circuit as are known in the art. Based upon the disclosure provided herein, one of ordinary skill in the art will recognize a variety of data detector circuits that may be used in relation to different embodiments of the present invention. Detected output 325 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and data decoder circuit 350. When data decoder circuit 350 is available, data decoder circuit 350 receives detected output 327 from central queue memory 360 as a decoder input 356. Data decoder circuit 350 applies a data decoding algorithm to decoder input 356 in an attempt to recover originally written data. Data decoder circuit 350 may be, for example, a low density parity check decoder circuit. Based upon the disclosure provided herein, one of ordinary skill in the art will recognize a variety of data decoder circuits that may be used in relation to different embodiments of the present invention.

The result of the data decoding algorithm is provided as a decoded output 354. Similar to detected output 327, decoded output 354 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 374. Data output 374 is provided to a hard decision output circuit 396 where the data is reordered before providing a series of ordered data sets as a data output 398.

One or more iterations through the combination of data detector circuit 325 and data decoder circuit 350 may be made in an effort to converge on the originally written data set. Processing through both the data detector circuit and the data decoder circuit is referred to as a "global iteration". For the first global iteration, data detector circuit 325 applies the data detection algorithm without guidance from a decoded output. For subsequent global iterations, data detector circuit 325 applies the data detection algorithm to buffered data 377 as guided by decoded output 354. Decoded output 354 is received from central queue memory 360 as a detector input 329.

During each global iteration it is possible for data decoder circuit 350 to make one or more local iterations including application of the data decoding algorithm to decoder input 356. For the first local iteration, data decoder circuit 350 applies the data decoder algorithm without guidance from a decoded output 352. For subsequent local iterations, data decoder circuit 350 applies the data decoding algorithm to decoder input 356 as guided by a previous decoded output 352. In some embodiments of the present invention, a default of ten local iterations is allowed for each global iteration.

In addition, a loop circuit 305 is used to, among other things, modify the sampling clock for the analog to digital converter circuits of dual source ADC and equalizer circuit 336. Loop circuit 305 includes a slope determination circuit 388 operable to determine a slope of digital samples 386 derived from input 318 to yield a slope 392, and a slope determination circuit 387 operable to determine a slope of digital samples 385 derived from input 308. Where, for example, implementation 498 of dual source ADC and equalizer circuit 336 is used, digital samples 385 correspond to digital samples 441 and digital samples 386 correspond to digital samples 451 to yield a slope 391. Slope determination circuits 387, 388 may be any circuit known in the art for determining slope based upon an input data set. In addition, loop circuit 305 includes a loop error circuit 390 operable to determine a loop error from digital samples 386 derived from input 318 to yield a loop feedback 395, and a loop error circuit 389 operable to determine a loop error from digital samples 385 derived from input 308 to yield a loop feedback 393. Loop error circuits 389, 390 may be any circuit known in the art for determining a loop error based upon an input data set.

Figure 4C:
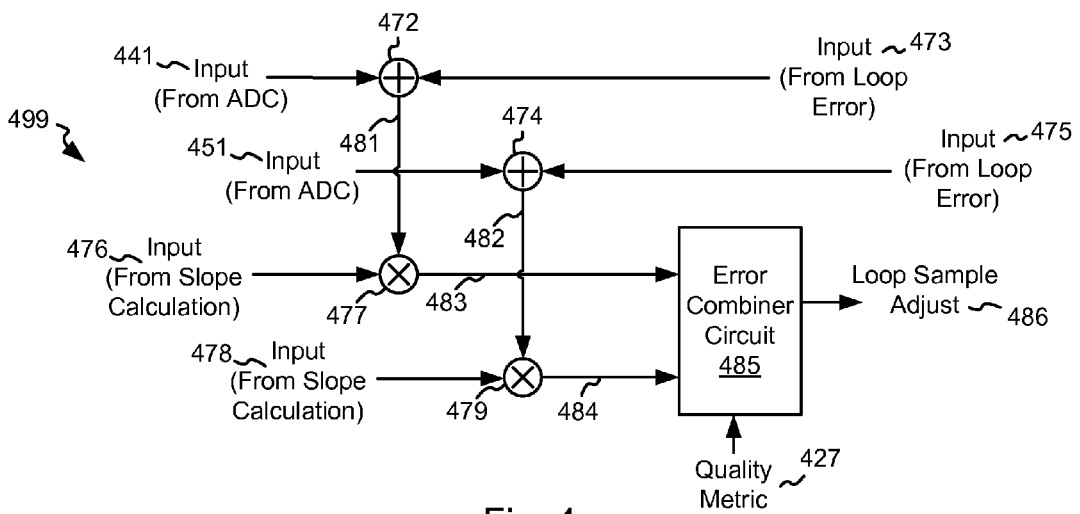

Slope 391, slope 392, digital samples 385, digital samples 386, loop feedback 393 and loop feedback 395 are provided to a combined error calculation circuit 397 that is operable to calculate an error feedback value 302 by combining information from input 308 and input 318. An example implementation of combined error calculation circuit 397 is shown in accordance with some embodiments of the present invention is shown in FIG. 4c. Turning to FIG. 4c, an implementation 499 is shown. Where implementation 499 is used in place of combined error calculation circuit 397, input 441 is connected to digital samples 385, input 451 is connected to digital samples 386, an input 473 is connected to loop feedback 393, an input 475 is connected to loop feedback 395, an input 476 is connected to slope 391, an input 478 is connected to slope 392, and loop sample adjust 486 is connected to error feedback value 302. Input 441 and input 473 are added by a summation circuit 472 to yield a result 481, and result 481 is multiplied by input 476 by a multiplier circuit 477 to yield a product 483. Input 451 and input 475 are added by a summation circuit 474 to yield a result 421, and result 482 is multiplied by input 478 by a multiplier circuit 479 to yield a product 484. An error combiner circuit 485 combines product 483 with product 484 in a proportion controlled by quality metric 427 to yield loop sample adjust 486. The combining of product 483 and product 484 to yield loop sample adjust 486 may be done similar to that discussed above in relation to FIG. 4b where equalized output 445 and equalized output 445 are combined in a proportion dictated by quality metric 427.

Figure 5:
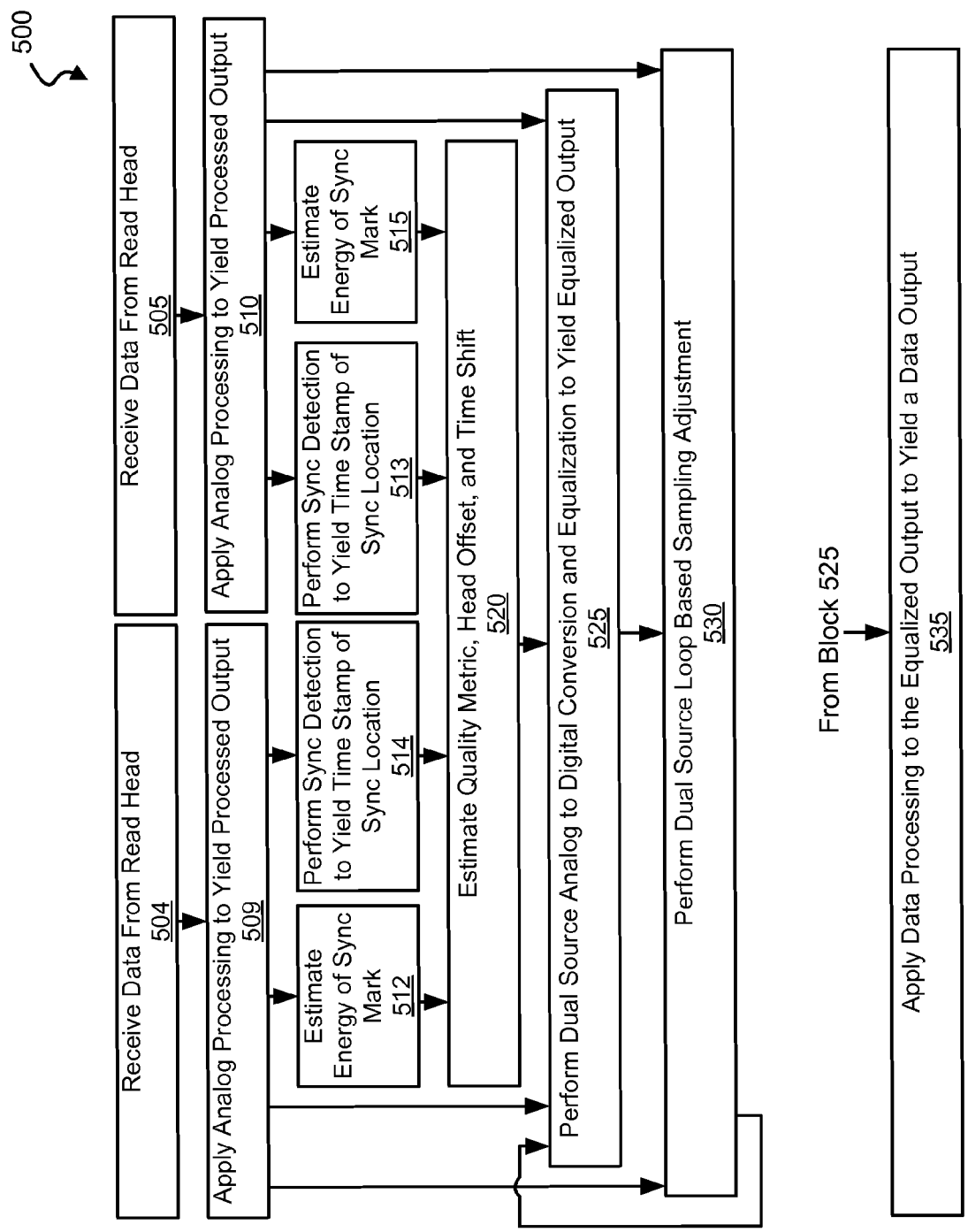
FIG. 5 is a flow diagram showing a method for balanced processing of multiple streams of data derived from the same track of a storage medium in accordance with one or more embodiments of the present invention.

Turning to FIG. 5, a flow diagram 500 shows a method for balanced processing of multiple streams of data derived from the same track of a storage medium in accordance with one or more embodiments of the present invention. Following flow diagram 500, data is received from two different read head (blocks 504, 505). Analog processing is applied to the data from each of the respective read heads to yield respective processed outputs (blocks 509, 510). Sync detection is performed on each of the processed outputs, and when a sync mark is found, a time stamp indicating the sync location is provided (blocks 514, 513). In addition, the energy of the actual preamble and the adjacent preamble is calculated (blocks 512, 515). Using the estimated energies and the time stamps of the sync marks, a quality metric, a head offset and a time shift are calculated (block 520). These calculations/determinations may be done similar to that set forth above in relation to FIGS. 3 and 4a.

Dual source analog to digital conversion and equalization is performed to yield an equalized output (block 525). This processing relies on the quality metric and the head offset as discussed above in relation to FIGS. 3 and 4b. Dual source loop based sampling adjustment is performed to modify the sampling clock used during the analog to digital conversion (block 530). This process may be performed similar to that discussed above in relation to FIGS. 3 and 4c. In addition, a data processing algorithm is applied to the equalized output to yield a data output (block 535). This data processing may be performed similar to that discussed above in relation to FIG. 3.

Figure 6:
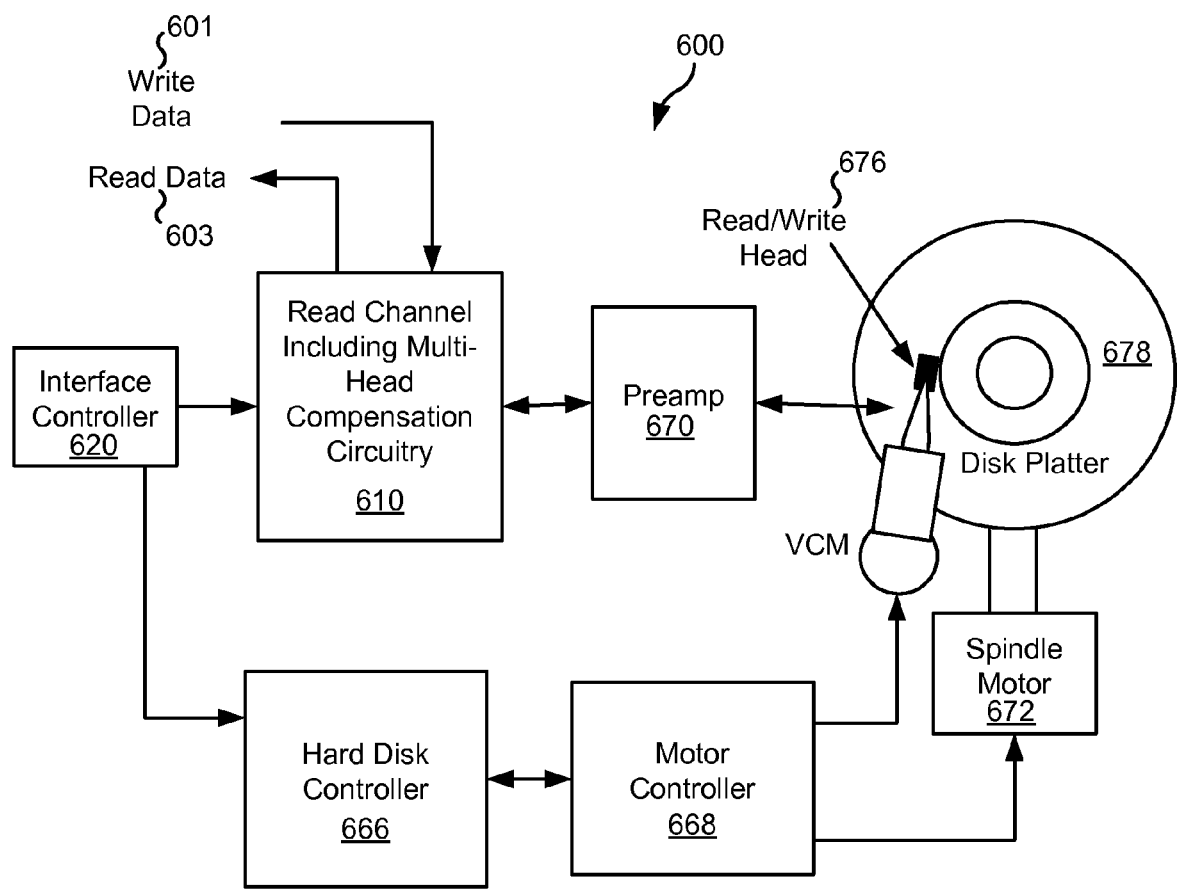
FIG. 6 shows a storage system that includes a read channel having multi-head compensation circuitry in accordance with one or more embodiments of the present invention.

Turning to FIG. 6, a storage system 600 is shown that includes a read channel 610 having multi-head compensation circuitry in accordance with one or more embodiments of the present invention. Storage system 600 may be, for example, a hard disk drive. Storage system 600 also includes a preamplifier 670, an interface controller 620, a hard disk controller 666, a motor controller 668, a spindle motor 672, a disk platter 678, and a read/write head 676. Read/write head 676 includes multiple individual read heads each sensing data on a given track of disk platter 678. Interface controller 620 controls addressing and timing of data to/from disk platter 678, and interacts with a host controller (not shown). The data on disk platter 678 consists of groups of magnetic signals that may be detected by read/write head assembly 676 when the assembly is properly positioned over disk platter 678. In one embodiment, disk platter 678 includes magnetic signals recorded in accordance with either a longitudinal or a perpendicular recording scheme.

In a typical read operation, read/write head 676 is accurately positioned by motor controller 668 over a desired data track on disk platter 678. Motor controller 668 both positions read/write head 676 in relation to disk platter 678 and drives spindle motor 672 by moving read/write head assembly 676 to the proper data track on disk platter 678 under the direction of hard disk controller 666. Spindle motor 672 spins disk platter 678 at a determined spin rate (RPMs). Once read/write head 676 is positioned adjacent the proper data track, magnetic signals representing data on disk platter 678 are sensed by read/write head 676 as disk platter 678 is rotated by spindle motor 672. The sensed magnetic signals are provided as a continuous, minute analog signal representative of the magnetic data on disk platter 678. This minute analog signal is transferred from read/write head 676 to read channel circuit 610 via preamplifier 670. Preamplifier 670 is operable to amplify the minute analog signals accessed from disk platter 678. In turn, read channel circuit 610 decodes and digitizes the received analog signal to recreate the information originally written to disk platter 678. This data is provided as read data 603 to a receiving circuit. A write operation is substantially the opposite of the preceding read operation with write data 601 being provided to read channel circuit 610. This data is then encoded and written to disk platter 678.

The data streams developed from each of the read heads of read/write head 676 are compared to determine its respective quality compared with streams derived from other of the read heads of read/write head 676. Based upon this quality, the streams from the multiple read heads are combined in a balanced manner to yield a combination signal to which additional data processing is applied. Disk platter 678 may include alternating preambles similar to that discussed above in relation to FIG. 2. A data processing circuit similar to that discussed above in relation to FIGS. 3-4 may be included in read channel 610. Further, the processing may be performed similar to that discussed above in relation to FIG. 5.

It should be noted that storage system 600 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 600, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 610 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 600 may be modified to include solid state memory that is used to store data in addition to the storage offered by disk platter 678. This solid state memory may be used in parallel to disk platter 678 to provide additional storage. In such a case, the solid state memory receives and provides information directly to read channel circuit 610. Alternatively, the solid state memory may be used as a cache where it offers faster access time than that offered by disk platted 678. In such a case, the solid state memory may be disposed between interface controller 620 and read channel circuit 610 where it operates as a pass through to disk platter 678 when requested data is not available in the solid state memory or when the solid state memory does not have sufficient storage to hold a newly written data set. Based upon the disclosure provided herein, one of ordinary skill in the art will recognize a variety of storage systems including both disk platter 678 and a solid state memory.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
   a first read head operable to sense information on a storage medium and to provide a first output;
   a second read head operable to sense information on a storage medium and to provide a second output;
   a synthesizer circuit operable to determine a quality metric based upon a signal to noise ratio of a first preamble pattern compared with a signal to noise ratio of a second preamble pattern; and
   a balancing circuit operable to generate a composite output as a combination of a first data set derived from the first output and a second data set derived from the second output based at least in part on the quality metric.

2. The data processing circuit of claim 1, wherein the first preamble pattern is a 2T pattern and the second preamble pattern is a 3T pattern.

3. The data processing circuit of claim 1, wherein the first read head and the second read head are disposed over the same target track on the storage medium, and wherein the target track on the storage medium exhibits the first preamble pattern.

4. The data processing circuit of claim 3, wherein a first adjacent track adjacent to one side of the target track exhibits the second preamble pattern, and wherein a second adjacent track adjacent to another side of the target track exhibits the second preamble pattern.

5. The data processing system of claim 1, the system further comprising:
   a first energy calculation circuit operable to calculate an energy of the first data set; and
   a second energy calculation circuit operable to calculate an energy of the second data set.

6. The data processing system of claim 5, wherein the signal to noise ratio of a first preamble pattern is calculated based upon the energy of the first data set and the signal to noise ratio of a second preamble pattern is calculated based upon the energy of the second data set.

7. The data processing system of claim 5, wherein the energy of the first data set includes a first preamble energy corresponding to energy from the first preamble pattern, and a second preamble energy corresponding to energy from the second preamble pattern; and wherein the energy of the second data set includes a third preamble energy corresponding to energy from the first preamble pattern, and a fourth preamble energy corresponding to energy from the second preamble pattern.

8. The data processing system of claim 1, wherein the synthesizer circuit is further operable to determine a head offset percentage of the first read head based upon a ratio of a signal to noise ratio of for the first preamble pattern to the signal to noise ratio for the second preamble pattern for data derived from the first output.

9. The data processing system of claim 1, wherein the synthesizer circuit is further operable to determine a head offset percentage of the second read head based upon a ratio of a signal to noise ratio of for the first preamble pattern to the signal to noise ratio for the second preamble pattern for data derived from the second output.

10. The data processing system of claim 1, wherein the data processing system further comprises:
    a first analog to digital converter circuit operable to convert the first output into a first series of digital samples synchronous to a clock;
    a second analog to digital converter circuit operable to convert the second output into a second series of digital samples synchronous to the clock; and
    a loop feedback circuit operable to generate a clock adjustment for use in modifying the clock, wherein the loop feedback circuit generates the clock adjustment based at least in part on a combination of the first data set and the second data set, and wherein the combination of the first data set and the second data set is generated based at least in part on the quality metric.

11. The data processing system of claim 1, wherein the data processing system is implemented as part of an integrated circuit.

12. The data processing system of claim 1, wherein the data processing system is implemented as part of a storage device, and wherein the storage device, and wherein the storage device includes:
    a storage medium disposed in relation to the first read head and the second read head, wherein the storage medium includes a target track, a first adjacent track on one side of the target track, and a second adjacent track on another side of the target track, and wherein the target track exhibits the first preamble pattern, and wherein both the first adjacent track and the second adjacent track exhibit the second preamble pattern.

13. The data processing system of claim 1, wherein the first preamble pattern is orthogonal to the second preamble pattern.

14. A storage device, the storage device comprising:
    a storage medium including a target track, a first adjacent track on one side of the target track, and a second adjacent track on another side of the target track, and wherein the target track exhibits a first preamble pattern, and wherein both the first adjacent track and the second adjacent track exhibit a second preamble pattern;
    a first read head operable to sense information on a storage medium and to provide a first output;
    a second read head operable to sense information on a storage medium and to provide a second output;
    wherein both the first read head and the second read head are disposed over the target track, and the first output and the second output correspond to information sensed from the target track; and
    a synthesizer circuit operable to determine a quality metric based upon a signal to noise ratio of a first preamble pattern compared with a signal to noise ratio of a second preamble pattern.

15. The storage device of claim 14, wherein the first preamble pattern is orthogonal to the second preamble pattern.

16. The storage device of claim 14, wherein the first preamble pattern is a 2T pattern and the second preamble pattern is a 3T pattern.

17. The storage device of claim 14, the storage device further comprising:
    a balancing circuit operable to generate a composite output as a combination of the first data set derived from the first output and a second data set derived from the second output based at least in part on the quality metric.

18. The storage device of claim 17, the storage device further comprising:
    a first energy calculation circuit operable to calculate an energy of the first data set; and
    a second energy calculation circuit operable to calculate an energy of the second data set.

19. The storage device of claim 18, wherein the signal to noise ratio of a first preamble pattern is calculated based upon the energy of the first data set and the signal to noise ratio of a second preamble pattern is calculated based upon the energy of the second data set.

20. The storage device of claim 18, wherein the energy of the first data set includes a first preamble energy corresponding to energy from the first preamble pattern, and a second preamble energy corresponding to energy from the second preamble pattern; and wherein the energy of the second data set includes a third preamble energy corresponding to energy from the first preamble pattern, and a fourth preamble energy corresponding to energy from the second preamble pattern.

\* \* \* \* \*